United States Patent
Su et al.

[11] Patent Number: 5,876,589
[45] Date of Patent: Mar. 2, 1999

[54] METHOD AND APPARATUS FOR SEPARATING OIL FROM WATER IN WASTEWATER CONTAINING AN EMULSIFIED OIL

[75] Inventors: Qingquan Su; Hiroaki Sato; Michihiro Noda, all of Kanagawa-ken, Japan

[73] Assignee: Ebara Corporation, Tokyo, Japan

[21] Appl. No.: 768,024

[22] Filed: Dec. 13, 1996

[30] Foreign Application Priority Data

| Dec. 15, 1995 | [JP] | Japan | 7-327140 |
| May 29, 1996 | [JP] | Japan | 8-156384 |
| Sep. 12, 1996 | [JP] | Japan | 8-262313 |
| Nov. 21, 1996 | [JP] | Japan | 8-324881 |

[51] Int. Cl.$^6$ .................................................. C02F 1/461
[52] U.S. Cl. .................. 205/695; 205/696; 205/746; 205/770; 205/703; 205/563; 205/570; 205/573; 205/263; 205/666
[58] Field of Search .................................. 205/746, 770, 205/695, 696, 703; 204/563, 570, 573, 263, 666

[56] References Cited

U.S. PATENT DOCUMENTS

| 4,927,511 | 5/1990 | Friehmett et al. ...................... 204/263 |
| 4,948,476 | 8/1990 | Kamperman et al. . |
| 5,164,480 | 11/1992 | Huibers et al. . |

FOREIGN PATENT DOCUMENTS

| 0 317 816 A | 5/1989 | European Pat. Off. . |
| 0 728 704 A | 8/1996 | European Pat. Off. . |
| 40 03 737 A | 8/1991 | Germany . |
| 44 08 797 A | 9/1995 | Germany . |
| 8-257303 | 10/1996 | Japan . |

OTHER PUBLICATIONS

Patent Abstracts of Japan, vol. 096, No. 11, 29 Nov. 1996 & JP 08 187402 A (Tokico Ltd), 23 Jul. 1996.

Qingquan Su, Kiyonoshin Hayami, and Jun Imamura, Surface Control & Cleaning Design (Senjyo Sekkei), "Total Recycle System 'AdFILOSS' in Aqueous or Semi–aqueous Cleaning" No. 62, 1994, pp. 10–17.

(List continued on next page.)

*Primary Examiner*—Arun S. Phasge
*Attorney, Agent, or Firm*—Wenderoth, Lind & Ponack, L.L.P.

[57] ABSTRACT

Wastewater containing a surfactant and an oil content that has been emulsified by the action of the surfactant can be freed of the oil content by a method including feeding the wastewater into the anode compartment, for electrolysis, of a diaphragm electrolyzer having an anode and a cathode provided in the anode compartment and a cathode compartment, respectively, which are spaced apart by a porous diaphragm and which are supplied with a dc voltage between the anode and the cathode, passing part of the electrolyzed wastewater through the diaphragm so that it enters the cathode compartment, discharging the influent from the cathode compartment, discharging the remainder of the electrolyzed wastewater from the anode compartment and introducing the same into the intermediate portion of a gas-liquid separator, withdrawing part of the influent from the top of the gas-liquid separator and introducing the same into a layer packed with an adhering material, where it is brought into contact with the adhering material, directing the effluent to an oil-water separation step for accomplishing the intended oil-water separation, and withdrawing the remainder from the bottom of the gas-liquid separator and returning the same to mix with the feed to the electrolysis step. Preferably, the polarities of the two electrodes are changed alternately at specified time intervals during the step of diaphragm electrolysis such that the anode compartment is switched to the cathode compartment and vice versa.

8 Claims, 6 Drawing Sheets

OTHER PUBLICATIONS

Kunihisa Oosasa, Hideo Nakakura, and Masao Sambuichi, Papers of Chemical Engineering (Kagaku Kogaku Ronbunshu), "Electroflotation Characteristics of O/W Emulsion" vol. 18, No. 4, 1992, pp. 433–440.

Yoshio Miyairi, Toshio Hattori, and Toshihumi Hirose, Technical Report of Mitsubishi Heavy Industry (Mitsubishi Jyuko Giho), "Development of Cleaning Metal Parts with Aqueous Solution" vol. 32, No. 5, 1995, pp. 342–345.

Andrzej B. Koltuniewicz and R.W. Field, Desalination, "Process Factors during Removal of Oil–in–Water Emulsions with Cross–Flow Microfiltration" vol. 105, 1996, pp. 79–89.

Qingquan Su, Hiroaki Sato and T. Noda, Surface Control & Cleaning Design (Senjyo Sekkei), "Cleaning System for Aqueous Solution That Do Not Give Waste Water" No. 68, 1995, pp. 32–37.

METHOD AND APPARATUS FOR SEPARATING OIL FROM WATER IN WASTEWATER CONTAINING AN EMULSIFIED OIL

BACKGROUND OF THE INVENTION

This invention relates to the separation of oil from water in wastewater containing an emulsified oil. More particularly, the invention relates to a method and an apparatus for performing oil-water separation by diaphragm electrolysis of water-base cleaning solutions, liquid waste water-soluble cutting oils and coolants that contain surfactants and oils at the same time.

As a result of the recent revision of the London Treaty on the ocean disposal of wastes, it is no longer possible to dump liquid waste water-soluble cutting oils and coolants into the sea which has been the method of disposal so far. Hence, it is urgently required to develop a technology that provides for economical land disposal of these kinds of wastewater.

Chlorine-base organic solvents such as Flon and trichloroethane which have hitherto been extensively used as industrial detergents are now recognized as ozone layer depleting substances and it was agreed internationally to prohibit the production of these substances by the end of 1995. Under these circumstances, the development of alternative detergents to Flon and trichloroethane is a peremptory need and they are being replaced by water-base detergents containing surfactants and alkalies as main components, quasi-water-base detergents comprising a mixture of water with organic solvents such as alcohols and glycol ethers, and non-water-base detergents typified by hydrocarbon-base solvents.

However, these substitute detergents have their own problems. To begin with, non-water-base detergents suffer from the disadvantage of high running costs since the cleaning operation is performed with these detergents alone. In addition, most of these non-water base detergents are inflammable, so that the cleaning apparatus must be designed to be explosion-proof (which increases its price) or cannot be of large size.

The water-base and quasi-water-base detergents, particularly, the water-base detergents, feature low running costs since they are diluted with large volumes of water before use. In addition, they are not potentially a hazard, so a large cleaning apparatus can be constructed easily at a fairly low cost. On the other hand, the use of large volumes of water requires that a water treatment unit capable of oil-water separation of cleaning solutions and ecologically acceptable discharge of rinse water should be installed as an essential component of the overall cleaning system. Consider, for example, the case of cleaning workpieces with water-base detergents. As the cleaning operation proceeds, contaminants such as oils from the workpiece build up gradually in the cleaning solution to reduce its detergency. Naturally, in order to extend the service life of the cleaning solution while maintaining its detergency, contaminants such as oils must be constantly removed from the cleaning solution.

Conventional methods of performing oil-water separation on water-base detergents include: an emulsion breaking and floating separation method which employs a chemical such as an emulsion breaker; an electrostatic separation method; a coalescer method which accelerates the coalescing and coarsening of oil particles; and a membrane separation method which employs an ultrafiltration membrane or a microfiltration membrane.

However, these conventional techniques have their own problems. In the emulsion breaking and floating separation method which employs an emulsion breaker, the cleaning solution which has been subjected to the oil-water separation treatment has no detergency and is not suitable for subsequent use. In the electrostatic separation method and the coalescer method, the intended effect of oil-water separation is not attained if the oil content of the cleaning solution is present as fine emulsion particles. The use of an ultrafiltration membrane or a microfiltration membrane has the disadvantage of removing not only the oil but also the detergent component and, in addition, an expensive apparatus has to be employed.

Water-base detergents are typically composed of surfactants as a main component which is responsible for detergency, as well as rust inhibitors, antifoaming agents, and organic or inorganic builders such as alkali components. The surfactants which are responsible for detergency may be nonionic or anionic but from a detergency viewpoint, nonionic surfactants having cloud points in the range from 30° to 60° C. are often used. Prior to use, the water-base detergents are diluted with water to a specified concentration, thereby formulating aqueous cleaning solutions.

At temperatures below their cloud points, nonionic surfactants dissolve in water and exhibit surface activity; however, at temperatures above their cloud points, the hydrophilic groups are dehydrated and the molecules associate with themselves to cause the loss of surface activity. At even higher temperatures, the nonionic surfactants precipitate either as a floc or in a liquid form. Conversely, if the temperature drops below the cloud point, the hydrophilic groups in the surfactant which have been insoluble are hydrated to become water soluble again, thereby restoring the surface activity.

Therefore, if an aqueous cleaning solution containing a nonionic surfactant as a main component is heated to a temperature higher than the cloud point, the surfactant will lose its surface activity and the oil content will float to separate from the water. However, if the cleaning solution has an oil contaminant, the surfactant will not precipitate on account of the interaction with the oil; on the contrary, it floats together with the oil content, making it impossible to discharge only the oil content from the system, which is the inherent object of the oil-water separation treatment.

There has been previously proposed a floating separation technology that could accomplish efficient oil-water separation of an aqueous cleaning solution even in the case where the latter was contaminated with an oil.

According to such technology, both a nonionic surfactant having a cloud point of 40°–70° C. and a nonionic surfactant having a cloud point of 20°–40° C. were incorporated in a water-base detergent and the contaminant such as oil in the cleaning solution could be separated by merely heating it to a temperature above the cloud point of the detergent. The technology also included a method for oil-water separation of the aqueous cleaning solution that has been used in the cleaning operation.

The technology works very effectively for cleaning solutions that contain water-insoluble oils and those which contain water-insoluble and non-emulsifiable oils; however, it has not been applicable to cleaning solutions that contain water-soluble oils or those which contain emulsifiable water-insoluble oils that incorporate anionic surfactants.

Oils used in the machining of metal parts consist of water-soluble oils typified by water-soluble cutting oils and coolants, and water-insoluble oils typified by press working oils and rolling mill oils. The water-insoluble oils are classified as an emulsifiable type and a non-emulsifiable type. The water-soluble oils typified by water-soluble cutting oils and coolants have high contents of anionic surface active substances such as sodium alkylsulfonates and some of the water-insoluble oils contain large amounts of calcium sulfonate and other anionic surface active substances as rust inhibitors. The water-base detergent previously developed and the method of oil-water separation based on the heating of such water-base detergent have been inapplicable to those oils which contain large amounts of anionic surface active substances.

SUMMARY OF THE INVENTION

In order to deal with these problems, the present inventors conducted intensive studies and accomplished an improved method for oil-water separation of cleaning solutions. The present inventors made further improvements of this basic technology (the first aspect of the invention), which will be described below as the second to the fourth aspects in the order of development.

Figure 1:
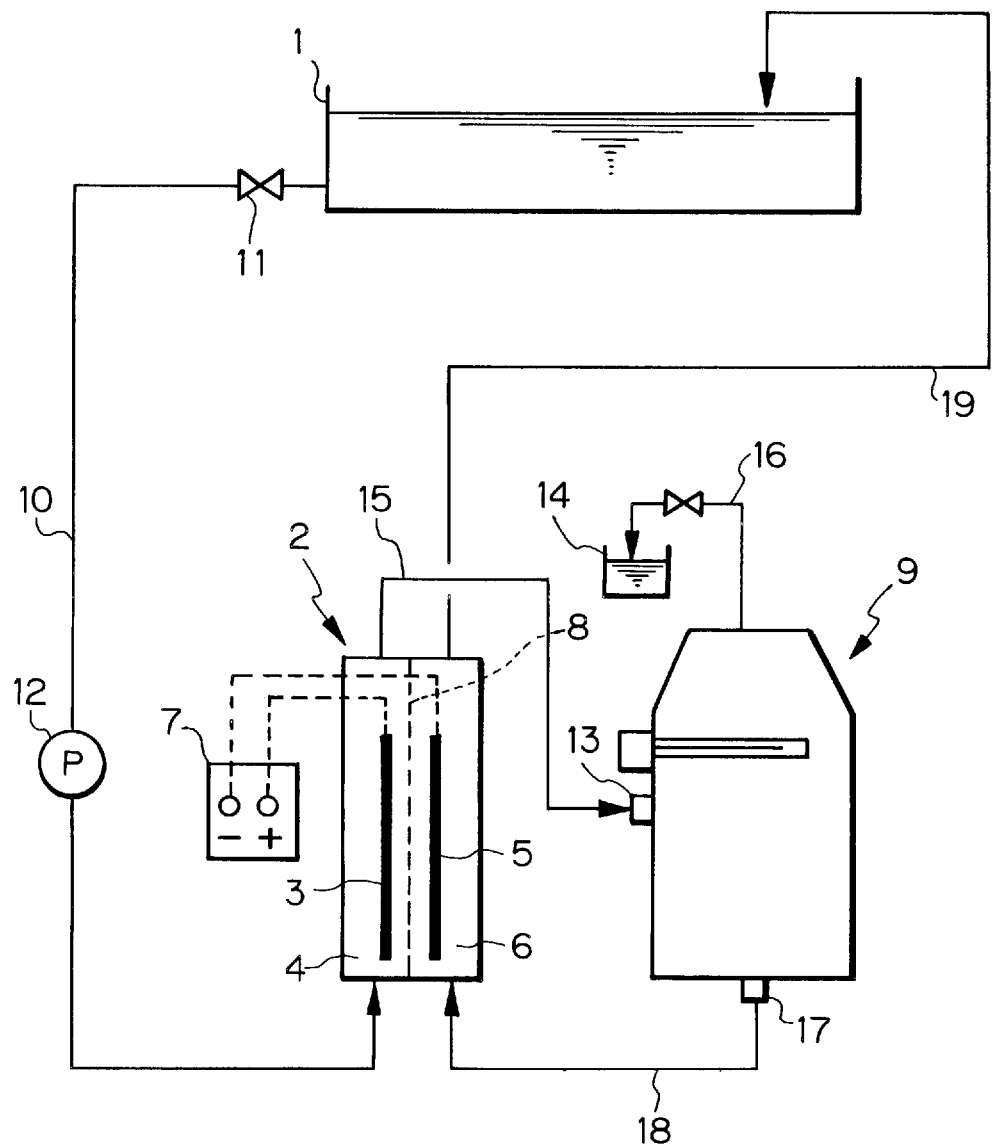
FIG. 1 shows schematically an example of the apparatus for performing oil-water separation according to the first aspect of the invention.

DETAILED DESCRIPTION OF THE INVENTION (1) First Aspect

The first and the core aspect of the invention relates to a method for oil-water separation of a cleaning solution in an oil-water separation step as it comes from a work cleaning step together with an oily contaminant, which comprises the steps of feeding the contaminated cleaning solution into the anode compartment of a diaphragm electrolyzer that is supplied with a dc current due to the application of a dc voltage between an anode and a cathode, heating the cleaning solution after it has passed through the anode compartment, introducing the heated cleaning solution to the oil-water separation step, where oil is separated from the water, and feeding the oil-free cleaning solution into the cathode compartment of the diaphragm electrolyzer.

The following are preferred embodiments of the first aspect of the invention.
  i) The cleaning solution is water.
  ii) The cleaning solution is water having a surfactant incorporated therein.
  iii) The cleaning solution is water having a nonionic surfactant incorporated therein.
  iv) The cleaning solution is water having incorporated therein both a nonionic surfactant having a cloud point of 20°–40° C. and a nonionic surfactant having a cloud point of 40°–80° C.
  v) The cleaning solution is water having incorporated therein a nonionic surfactant having a cloud point of 20°–40° C., a nonionic surfactant having a cloud point of 40°–80° C., and a builder.
  vi) The builder is sodium sulfate.

The basic method of oil-water separation and the preferred embodiments described above can be effectively implemented by an apparatus which comprises a cleaning solution tank, a diaphragm electrolyzer having an anode and a cathode provided in an anode compartment and a cathode compartment, respectively, that are spaced apart by a porous diaphragm, and an oil-water separation tank and which is so adapted that a contaminated cleaning solution is fed from the cleaning solution tank into the anode compartment of the diaphragm electrolyzer, from which it is fed to the oil-water separation tank through an inlet and emerges therefrom through an outlet to be fed into the cathode compartment of the diaphragm electrolyzer.

The cleaning solution to be used in the above-described method preferably contains builders that are not only effective for rust inhibiting and antifoaming purposes but also are capable of enhancing electrical conductivity. Preferred builders are those which will not experience any chemical changes during electrolysis, as exemplified by sodium sulfate and potassium sulfate.

In the first aspect of the invention, the cleaning solution as it passes through the anode compartment of the diaphragm electrolyzer is oxidized with nascent oxygen and otherwise sterilized, so it can be put to service for a prolonged period of time without putrefaction even if no sterilizing agents are added.

The workpiece to which water-soluble cutting oils have adhered is occasionally cleaned with either water alone or in the presence of sodium sulfate. The oil-separation method according to the first aspect of the invention is also effective for this type of cleaning solution, as well as in the case where the cleaning solution is replenished during the cleaning operation.

In the preferred case ii), the cleaning solution is water having a surfactant incorporated therein and the surfactant is typically anionic or nonionic; if necessary, a mixture of anionic and nonionic surfactants may be employed. It should, however, be mentioned that the use of anionic surfactants is preferably minimized since they have an acid buffering action and make it difficult to achieve the intended pH adjustment of the cleaning solution if they are contained in large amounts.

Preferred anionic surfactants include sodium alkylsulfonates and sodium alkylcarboxylates. Preferred nonionic surfactants include various types such as polyoxyethylene alkyl phenyl ether, polyoxyethylene alkyl ether, polyethylene glycol, sorbitan fatty acid ester, polyoxyethylene sorbitan fatty acid ester and pluronic types.

Of the two types of nonionic surfactants that may be used in the invention, the one having the lower cloud point (20°–40° C.) preferably has a cloud point in the range of 25°–30° C.

The first aspect of the invention has the following two major characteristic features.
  1) A diaphragm electrolyzer is provided after the step of cleaning the workpiece and the cleaning solution from the cleaning step which contains an oily contaminant is fed into the anode compartment of the diaphragm electrolyzer, where it is rendered acidic, and the cleaning solution is then fed into the oil-water separation step, where it is freed of the oil contaminant, and subsequently it is fed into the cathode compartment of the diaphragm electrolyzer, where it is reverted to the initial pH.

2) Due to the presence of an anionic surfactant such as a sodium alkylsufonate which is incorporated in a large amount in a water-soluble oil or of an anionic surface active substance such as calcium sulfonate which is incorporated in a water-insoluble oil, the oily contaminant which has been cleaned and dispersed by means of the nonionic surfactant which is the main component of the detergent used in the invention cannot be separated from water if it is heated to a temperature above the cloud point of said nonionic surfactant; however, according to the first aspect of the invention, the cleaning solution is rendered acidic by being fed into the anode compartment of the diaphragm electrolyzer and, as a result, the oil dispersing effect of the anionic surfactant or anionic surface active substance is inactivated in such a way that the intended oil-water separation is accomplished.

The effectiveness of the inventive method for the oil-water separation of a cleaning solution by employing a diaphragm electrolyzer will now be described specifically with reference to the case where the cleaning solution contains a nonionic surfactant and a builder as two main components.

If a metal part is degreased and cleaned with the above-described type of cleaning solution, the oil removed from the metal part is emulsified with the nonionic surfactant to become dispersed in the cleaning solution. If the cleaning solution contaminated by the emulsified oil content is heated to a temperature above the cloud point of the nonionic surfactant, the emulsion breaks, causing the oil to be separated by flotation. However, if the contaminated cleaning solution further contains an anionic surfactant or an anionic surface active substance, (i) the cloud point of the nonionic surfactant in the cleaning solution will increase and, in addition, (ii) the anionic surfactant or surface active substance works effectively to continue the emulsification of the oil.

Needless to say, the intended mechanism of oil-water separation will not function properly if the cloud point of the nonionic surfactant in the cleaning solution becomes higher than the temperature setting for heating in the oil-water separation step or if an unduly increased amount of the oil is emulsified by the anionic surfactant.

The anionic surfactant exhibits its surface activity when it is dissociated to become anionic and only in this state can the anionic surfactant emulsify the oil content. However, as is well known, if the pH of the water in which the anionic surfactant dissolves or in which it is dispersed as micelles becomes lower than its pKa value, it will not be dissociated but hydrogen will bind to anionic groups, thereby causing the loss of surface activity and rendering the surfactant to become insoluble in water. This behavior is also shown by the anionic surface active substance. In order to lower the pH of the water in which the anionic surfactant dissolves or in which it is dispersed as micelles, an acid may be added but this method is not preferred due to the generation of by-products such as salts.

In the first aspect of the invention, the cleaning solution containing the emulsified oil is fed into the anode compartment of a diaphragm electrolyzer and the water is electrolyzed in accordance with the reaction scheme set forth below, whereby hydrogen ions are generated in the medium in the anode compartment:

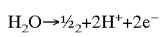

$$H_2O \rightarrow \tfrac{1}{2}O_2 + 2H^+ + 2e^-$$

The generated hydrogen ions make the cleaning solution acidic.

If the pH of the cleaning solution is made lower than the pKa value of the anionic surfactant such as a sodium alkylsulfonate which is present in the cleaning solution by thusly generating hydrogen ion, the sodium alkylsulfonate will undergo the following reaction:

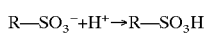

$$R-SO_3^- + H^+ \rightarrow R-SO_3H$$

whereby the hydrogen ion binds to the anionic group to cause the loss of surface activity of the anionic surfactant, thereby making it insoluble in water. In this way, the deleterious effect of the anionic surfactant or surface active substance on the progress of oil-water separation can be reduced satisfactorily in the first aspect of the invention. The cleaning solution may be rendered acidic to a pH value of 3–7 and, for practical purposes, satisfactory results can be attained if the pH is within the range of 5–7.

The pH adjusted cleaning solution emerging from the anode compartment of the diaphragm electrolyzer is then fed into the oil-water separation tank, where the temperature of the cleaning solution is raised to a specified value higher than the cloud point of the nonionic surfactant contained in the cleaning solution so that the oil is separated therefrom; the oil-separated cleaning solution is fed into the cathode compartment of the diaphragm electrolyzer and the water is electrolyzed in accordance with the reaction scheme set forth below, whereby hydroxyl ions are generated in the medium in the cathode compartment:

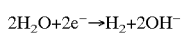

$$2H_2O + 2e^- \rightarrow H_2 + 2OH^-$$

The generated hydroxyl ion can neutralize the acidic cleaning solution.

The diaphragm electrolyzer to be used in the first aspect of the invention has the anode compartment partitioned from the cathode compartment by means of an ion-permeable diaphragm and an anode and a cathode are provided in the anode and cathode compartments, respectively. An organic microfiltration (MF) membrane having an average pore size of 0.1–3.0 μm is usually employed as the ion-permeable diaphragm. Any insoluble electrode may be employed without particular limitations but an electrode comprising a titanium or other metal substrate that is plated with platinum is advantageously used as the anode and cathode; if desired, less costly ferrite or stainless steal electrodes may be used as the cathode.

If the cleaning solution is a water containing nonionic surfactant having a cloud point of 20°–40° C., the relative proportion of the ionic surfactant to be incorporated may be in the range of 0.2–1 compared with the nonionic surfactant used as the detergent; for instance, the cleaning solution having a detergent loading of 5% may incorporate 1–5% of the nonionic surfactant having a cloud point of 20°–40° C.

An example of the apparatus for performing oil-water separation according to the first aspect of the invention is shown in FIG. 1. Metal parts that have been subjected to press working and which have an emulsifiable water-insoluble oil film adhering to their surface are cleaned in a cleaning tank 1 by means of an aqueous solution that contains a sodium alkylsulfonate and a nonionic surfactant of a polyoxyethylene alkyl phenyl ether type as detergents and which has sodium sulfate added as a builder. The cleaning solution containing an oily contaminant such as the emulsifiable water-insoluble oil is supplied into a diaphragm electrolyzer 2 at an anode compartment 4 containing an anode 3 via a feed pipe 10 equipped with a valve 11 and a feed pump 12. The diaphragm electrolyzer 2 is divided into the anode compartment 4 and a cathode compartment 6 by a diaphragm 8 and they respectively contain the anode 3 and a cathode 5, which are supplied with a predetermined dc current from a power source 7. In the anode compartment 4, water is electrolyzed to generate hydrogen ions, which will cause of the loss of the surface activity of the anionic surface active substance such as the sodium alkylsulfonate in the oil-contaminated cleaning solution which has been fed into said anode compartment.

The cleaning solution thus rendered acidic emerges from the anode compartment 4 and passes through a pipe 15 to be fed into an oil-water separation tank 9 via an inlet 13; in the oil-water separation tank 9, the cleaning solution is heated to a temperature higher than the cloud point of the nonionic surfactant of a polyoxyethylene alkyl phenyl ether type.

The cleaning solution in the oil-water separation tank 9 needs only to be heated to a temperature in the range of 50°–80° C., preferably 60°–65° C., so that the oil content is selectively separated by flotation.

The cleaning solution is allowed to stay within the oil-water separation tank 9 for a detention time of no more than about 20 minutes and the separated oil content is continuously discharged out of the system to flow into an oil tank 14 via a connection pipe 16.

The oil-freed cleaning solution is withdrawn from the bottom of the oil-water separation tank 9 via an outlet 17.

The cleaning solution from which the oil content and part of the surfactant have been removed flows through a pipe 18 connected to the outlet 17 such that it is fed into the cathode compartment 6 of the diaphragm electrolyzer 2 in which the cathode 5 is provided. In the cathode compartment 6, water is electrolyzed to generate hydroxyl ions, which will neutralize the cleaning solution fed into said cathode compartment. The neutralized cleaning solution leaves the cathode compartment 6 and passes through a pipe 19 to return to the cleaning tank 1. If desired, the cleaning solution which has been adjusted to the initial pH in the cathode compartment 6 may be directly discharged out of the system without being returned to the cleaning tank 1.

In the first aspect of the invention, the cleaning solution to be treated is forced by a feed pump to circulate in a single pass through a closed loop starting with the cleaning tank, followed in order by the anode compartment, oil-water separation tank and cathode compartment and ending with the cleaning tank. In order to break the emulsified oil particles in the cleaning solution, its pH must be made lower than the pKa value of the anionic surfactant and its temperature higher than the cloud point of the nonionic surfactant within the single pass. To this end, the throughput, namely, the quantity of circulating flow has to be lowered as the pH or alkalinity of the cleaning solution increases. However, the smaller quantity of circulating flow reduces the flow rate of the liquid on the surface of the diaphragm, thereby increasing the likelihood of the contamination of the membrane and accelerating the increase of the electrolytic voltage.

To solve these problems, it is important to ensure that the quantity of circulating flow to the electrolyzer diaphragm, particularly to the anode compartment, is always kept at a high level regardless of the nature of the cleaning solution to be treated.

(2) Second Aspect

The second aspect of the invention has been accomplished in order to meet the above-described requirement. It relates to a method for oil-water separation of wastewater containing a surfactant and an oil content that has been emulsified by the action of said surfactant. As in the first aspect, the diaphragm electrolyzer used in the second aspect has an anode and a cathode provided in an anode compartment and a cathode compartment, respectively, which are spaced apart by a porous diaphragm; however, in the second aspect, the anode compartment of the diaphragm electrolyzer is supplied with the feed wastewater, part of which is passed through the diaphragm to enter the cathode compartment, from which it is discharged while the remainder of the wastewater is discharged from the anode compartment, thereby accomplishing the intended oil-water separation.

According to the second aspect of the invention, there is also provided an apparatus for water-oil separation of wastewater containing a surfactant and an oil content that has been emulsified by the action of said surfactant, which comprises a diaphragm electrolyzer having an anode and a cathode provided in an anode compartment and a cathode compartment, respectively, that are spaced apart by a porous diaphragm, and a tank for oil water separation of the effluent from the anode compartment, said diaphragm electrolyzer being connected to said oil-water separation tank in such a way that the latter is supplied with the feed wastewater, which is withdrawn from the bottom of said oil-separation tank to be fed into the anode compartment of said diaphragm electrolyzer, with part of the effluent from the anode compartment being passed through the diaphragm to enter the cathode compartment, from which it is discharged while the remainder of the effluent is returned to the oil-water separation tank.

The tank for oil-water separation of the effluent from the anode compartment is preferably equipped with an electric heater. Additionally, a wastewater receiving tank or receptacle may be provided above said oil-water separation tank and the two tanks are connected in such a way that the wastewater can be fed into the separation tank due to the difference in liquid level. In this case, the bottom of the oil-water separation tank is connected to the receiving tank via a feed pump and a return valve. If desired, a separate oil-water separation tank may be provided and connected in such a way that it can be supplied with the effluent from the cathode compartment; in this case, the bottom of said separation tank may be connected to the wastewater receiving tank. Furthermore, an oil receptacle may be provided in such a way that it is connected to the top of each separation tank.

The wastewater receiving tank may be used either as a tank for receiving the wastewater containing both the surfactant used to clean the workpiece and the emulsified oil or as a tank in which the workpiece is directly cleaned.

In the method of oil-water separation according to the second aspect of the invention, the pH of the wastewater in the anode compartment can be rendered lower than the pKa (acid dissociation index) of the anionic surfactant in water by diaphragm electrolysis and the electrical permeation of water from the anode compartment to the cathode compartment combines with the filter effect of the differential pressure (0–0.2 MPa) between the anode and cathode compartments to enrich the oil content not only in the anode compartment but also in the associated oil-water separation tank. The factor of enrichment is adjusted to be in the range of 0.5–5. Electrical permeation is a phenomenon that occurs when cations such as Na$^+$ electrophorese from the anode to the cathode compartment during electrolysis and it is characterized by the permeation of water from the anode to the cathode compartment through the diaphragm (which in the present invention is a microfiltration membrane having an average pore size of 0.1–3.0 μm).

If desired, sodium phosphate or sodium tripolyphosphate and/or sodium sulfate may be incorporated in an amount of up to 30 mM in the wastewater to be treated and this is effective not only in preventing scale deposition on the cathode surface and the diaphragm on account of the hardness components such as calcium, magnesium and barium but also for increasing the electrical conductivity of the wastewater to be treated.

According to another feature of the second aspect, the effluent from the anode compartment is returned to the associated oil-water separation tank, whereby the reaction for insolubilizing the anionic surfactant by reducing the pH is carried out not in the anode compartment but in the tank for oil-water separation of the effluent from the anode compartment and, in addition, the liquid flow rate on the side of the diaphragm facing the anode compartment is increased to 0.1–0.5 m/sec. These are effective not only in preventing the plugging of the diaphragm but also for maximizing the efficiency of oil separation in a single pass of the effluent from the anode compartment to the oil-water separation tank, thereby enhancing the capacity for oil separation per unit electrolytic current.

If an electric heater provided in the tank for oil-water separation of the effluent from the anode compartment is used to heat the effluent to a temperature above the cloud point of the nonionic surfactant, the efficiency of oil separation can be enhanced; in addition, the effluent from the cathode compartment may be introduced into the associated oil-separation tank, whereby the oil contaminant passing through the diaphragm can be separated by flotation to achieve a further improvement in the efficiency of oil-water separation.

Surfactants that may be present in the wastewater to be treated in accordance with the second aspect of the invention include anionic surfactants such as organic sodium carboxylates, organic sodium sulfonates and organic sodium sulfate, and nonionic surfactants of various types such as polyoxyethylene alkyl phenyl ether, polyoxyethylene alkyl ether, polyethylene glycol, sorbitan fatty acid ester, polyoxyethylene sorbitan fatty acid ester and pluronic types. Inorganic builders that may be present in the wastewater include various kinds of sodium phosphate, sodium silicate and sodium borate.

The wastewater to be treated has preferably an alkalinity in the range of 0.1–10.0. The term "alkalinity" as used herein means the quantity in milliliters of 0.1N HCl required to titrate 10 ml of the wastewater feed to an end pH point of 4.8.

In the second aspect of the invention, the wastewater containing the emulsified oil is fed into the anode compartment of a diaphragm electrolyzer and the water is electrolyzed in accordance with the reaction scheme set forth below, whereby hydrogen ions are generated in the medium in the anode compartment:

$$H_2O \rightarrow \tfrac{1}{2}O_2 + 2H^+ + 2e^{31}$$

The generated hydrogen ions make the cleaning solution acidic.

If the pH of the electrolyzed wastewater is made lower than the pKa value of the anionic surfactant such as a sodium alkylsulfonate which is present in the wastewater by thus generating hydrogen ion, the sodium alkylsulfonate will undergo the following reaction:

$$R—SO_3^{31} + H^+ \rightarrow R—SO_3H$$

whereby hydrogen ion binds to the anionic group to cause the loss of surface activity of the anionic surfactant, thereby making it insoluble in water. In this way, the deleterious effect of the anionic surfactant or surface active substance on the progress of oil-water separation can be reduced satisfactorily in the second aspect of the invention. The wastewater may be rendered acidic to a pH value of 1–7 and, for practical purposes, satisfactory results can be attained if the pH is within the range of 3–7.

In the second aspect of the invention, electrical permeation is another driving force to enrich the oil content. Stated more specifically, as cations such as Na$^+$ electrophorese from the anode to the cathode compartment, water permeates the diaphragm (having an average pore size of no more than 3 μm) to move from the anode to the cathode compartment, whereby the oil content of the electrolyzed wastewater in the anode compartment or the associated oil-water separation tank is sufficiently enriched.

The pH adjusted wastewater emerging from the anode compartment of the diaphragm electrolyzer is then fed into the oil-water separation tank, where the temperature of the electrolyzed wastewater is raised to a specified value higher than the cloud point of the nonionic surfactant contained in the wastewater so that the oil is separated therefrom; the oil-separated wastewater is returned to the anode compartment of the diaphragm electrolyzer.

The diaphragm electrolyzer and the porous diaphragm which are to be employed in the second aspect of the invention are identical to those used in the first aspect.

Figure 2:
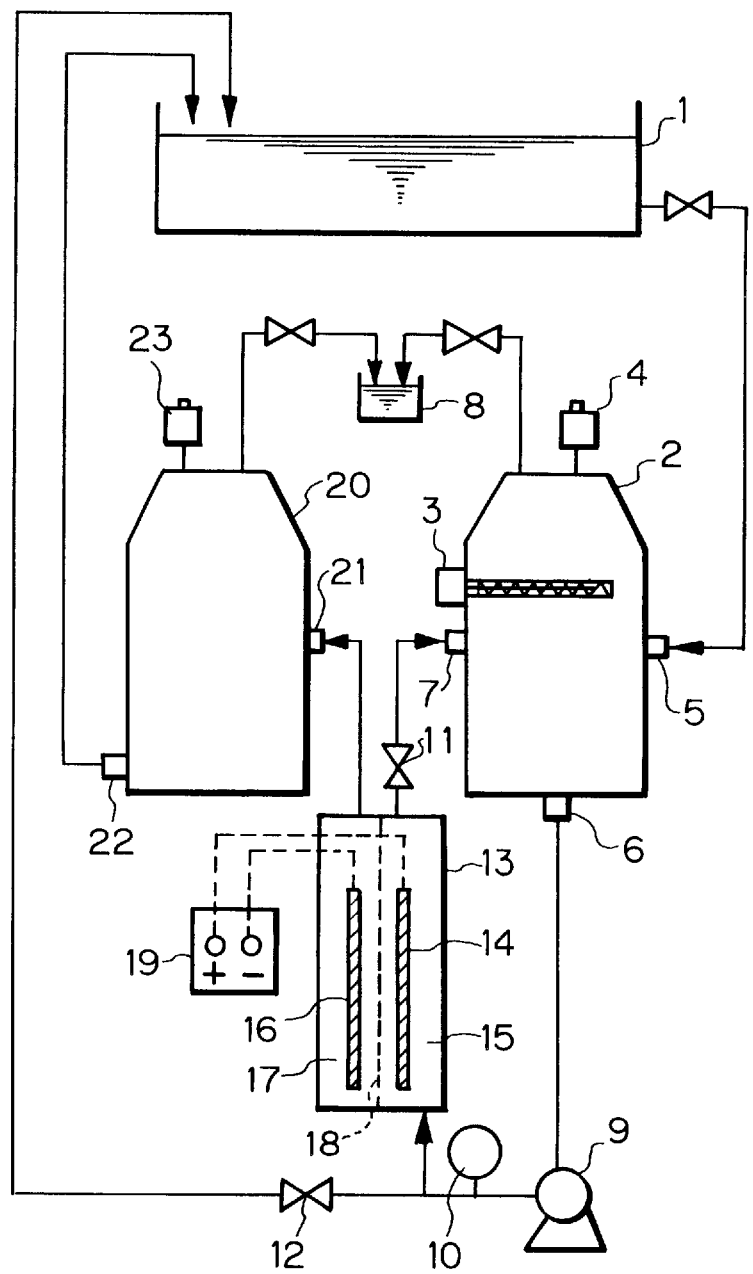
FIG. 2 shows schematically an example of the apparatus for performing oil-water separation according to the second aspect of the invention.

An example of the apparatus for performing oil-water separation according to the second aspect of the invention is shown in FIG. 2. A receptacle 1 holds wastewater containing an emulsified oil content. The wastewater is fed into an oil-water separation tank 2 via an inlet 5. The tank 2 is equipped with an electric heater 3 and an air vent valve 4. The wastewater emerging from the tank 2 via an outlet 6 is forced by a feed pump 9 into a diaphragm electrolyzer 13 at an anode compartment 15 containing an anode 14. The diaphragm electrolyzer 13 is divided into the anode compartment 15 and a cathode compartment 17 by a diaphragm 18 and they respectively contain the anode 14 and a cathode 16, which are supplied with a predetermined dc current from a power source 19. In the anode compartment 15, water is electrolyzed to generate hydrogen ions, which will cause the loss of the surface activity of the anionic surface active substance such as the sodium alkylsufonate in the wastewater which has been fed into said anode compartment.

The wastewater thus rendered acidic emerges from the anode compartment 15 of the diaphragm electrolyzer 13 to enter the oil-water separation tank 2 via an inlet 7; in the separation tank 2, the effluent is heated with the electric heater 3 to a temperature higher than the cloud point of the nonionic surfactant.

The effluent fed into the oil-water separation tank 2 needs only to be heated to a temperature in the range of 50°–80° C., preferably 60°–70° C., so that the oil content is selectively separated by flotation.

The effluent is allowed to stay within the oil-water separation tank 2 for a detention time of no more than about 20 minutes and the separated oil content is continuously or intermittently discharged out of the system to flow into an oil reservoir 8 whereas the aqueous phase is recovered from the tank 2 via the outlet 6 to return to the anode compartment 15.

That part of the electrolyzed wastewater in the anode compartment 15 which has passed through the diaphragm 18 to flow into the cathode compartment 17 is fed into another oil-water separation tank 20 via an inlet 21 and, in that tank 20, the oil content that has passed through the diaphragm 18 is separated and sent to the oil reservoir 8 whereas the aqueous phase emerges from the bottom of the tank 20 via an outlet 22 to be returned to the receptacle 1. Shown by 23 is an air vent valve.

Thus, the wastewater to be treated is subjected to oil-water separation as it circulates between the oil-water separation tank 2 and the anode compartment 15 of the diaphragm electrolyzer 13. The circulation loop is fitted with a pressure gage 10 and a pressure regulating valve 11. A valve 12 for returning the effluent from the anode compartment is operated to withdraw the aqueous phase into the receptacle 1 such that the pH of the effluent is maintained at a predetermined constant level.

(3) Third Aspect

In FIG. 2 showing the apparatus for implementing the method of oil-water separation in accordance with the second aspect, the electrolyzed wastewater from the anode compartment 15 is directly connected to the tank 2 for oil-water separation of the effluent from the anode compartment and both the anode 14 and the cathode 16 are fixed in position.

Because of these design features, the second aspect of the invention has had the following problems.

(a) The pH of the effluent from the anode compartment has to be lowered to a value that induces oil-water separation, namely, a value that causes the emulsified oil particles to be adequately ruptured. If the desired oil-water separation can be accomplished at higher pH levels, the separation efficiency will be improved.

(b) As the treatment progresses, the diaphragm and the surface of each electrode are gradually contaminated and, as a result, less water will permeate through the diaphragm to move from the anode to the cathode compartment, thereby increasing the electrolytic voltage required to maintain a constant electrolytic current level. It is therefore necessary to provide means of decontaminating the diaphragm and electrodes to thereby restore the desired permeate flow and voltage.

Hence, the third aspect of the invention intends to provide a method and an apparatus for oil-water separation of wastewater containing an emulsified oil that are capable of the intended oil-water separation at a higher pH than in the second aspect and which adopt simple means of decontaminating the diaphragm and electrodes to thereby restore the desired permeate flow and voltage.

The third aspect of the invention relates to a method for oil-water separation of wastewater containing a surfactant and an oil content that has been emulsified by the action of said surfactant. As in the first aspect, the diaphragm electrolyzer used in the third aspect has an anode and a cathode provided in an anode compartment and a cathode compartment, respectively, which are spaced apart by a porous diaphragm. As in the second aspect, the anode compartment of the diaphragm electrolyzer is supplied with the feed wastewater for electrolysis and part of the electrolyzed wastewater is passed through the diaphragm to enter the cathode compartment, from which it is discharged while the remainder of the electrolyzed wastewater is discharged from the anode compartment and thence introduced into a layer packed with an adhering material, where it is brought into contact with the adhering material and, thereafter, the effluent is directed to an oil-water separation step for accomplishing the intended oil-water separation.

In a preferred embodiment, the polarities of the two electrodes are changed alternately at specified time intervals during the step of diaphragm electrolysis such that the anode compartment is switched to the cathode compartment and vice versa.

According to the third aspect of the invention, there is also provided an apparatus for water-oil separation of wastewater containing a surfactant and an oil content that has been emulsified by the action of said surfactant, which comprises a diaphragm electrolyzer having an anode and a cathode provided in an anode compartment and a cathode compartment, respectively, that are spaced apart by a porous diaphragm, a column packed with an adhering material, and a tank for oil-water separation of the effluent from the anode compartment, with the diaphragm electrolyzer, the packed column and the oil-water separation tank being interconnected in such a way that the separation tank is supplied with the feed wastewater, which is withdrawn from the bottom of said separation tank to be fed into the anode compartment of said diaphragm electrolyzer, with part of the effluent from the anode compartment being passed through the diaphragm to enter the cathode compartment, from which it is discharged while the remainder of the effluent is directed in an upward flow into the packed column, where it is brought into contact with the adhering material and, thereafter, said remainder is returned to the oil-water separation tank.

In a preferred embodiment, the diaphragm electrolyzer is adapted to be capable of changing the polarities of the two electrodes alternately such that the anode is switched to the cathode compartment and vice versa while, at the same time, the pipes connecting to the anode and cathode compartments are accordingly switched.

Since the third aspect of the invention is similar to the second aspect in many ways, the following description concerns only the difference, which is the provision of a coalescer, or a layer packed with an adhering material, between the diaphragm electrolyzer and the tank for oil-water separation of the effluent from the anode compartment. In the second aspect, the wastewater to be treated which contains an emulsified oil is supplied into the tank for oil-water separation of the effluent from the anode compartment and it is then withdrawn from the bottom of said separation tank to be fed into the anode compartment of the diaphragm electrolyzer and part of the wastewater electrolyzed in the anode compartment is passed through the diaphragm to enter the cathode compartment, from which it is discharged where the remainder of the electrolyzed wastewater is returned to the associated separation tank. In the third aspect, the electrolyzed wastewater in the anode compartment is partly returned to the associated separation tank after it is directed in an upward flow into the layer packed with an adhering material such that it is brought into contact with said adhering material.

By causing the oil particles in the electrolyzed wastewater to attach to the adhering material, the oil particles will collide at an increased rate and their coalescing and coarsening are sufficiently promoted to provide the so-called "oil-water separation effect" of the coalescer. This effect combines synergistically with the oil-water separation effect of diaphragm electrolysis to increase the specified pH for oil-water separation and thereby improve the overall efficiency of oil-water separation.

The layer packed with the adhering material which works as a coalescer may assume a cylindrical, rectangular or any other shape; the adhering material with which the layer is to be packed may be of any nature as long as it is chemically stable and has a large specific surface area, and an advantageous example of its shape is an aggregate of particulate matter or fibers. Exemplary particulate adhering materials include quartz sand, zeolite and kaolin, and exemplary fibrous adhering materials include slag wool and synthetic fibers. The larger the volume of the layer packed with the adhering material, the longer the contact time and the more effective the layer is as a coalescer. The superficial velocity (SV in $h^{-1}$) of the electrolyzed wastewater passing through the layer packed with the adhering material will suffice if it is within the range of 20–200 $h^{-1}$.

As an apparatus for wastewater treatment, the additional advantage of causing the oil particles to attach to the adhering material is that they will have an increased density on the adhering material to achieve more efficient contact between the oil content and the electrolyzed wastewater. As a result, hydrophobic organic matter, such as the nonionic surfactant, in the electrolyzed wastewater or the anionic surfactant which has become no longer dissociable into an acid on account of the acidic nature of the electrolyzed wastewater can be extracted with the oil content and, hence, can be rejected together with the latter.

In a preferred embodiment of the third aspect, the polarities of the two electrodes are changed alternately at specified time intervals such that the anode is switched to the cathode and vice versa at specified time intervals while, at the same time, the pipes connecting to the anode and cathode compartments are accordingly switched. The wastewater in the anode compartment is usually acidic in nature, so part of the anionic surfactant will become insoluble and the resulting insoluble matter, as well as the broken oil particles that are no longer in an emulsified state will occasionally form a deposit that contaminates the surfaces of the electrodes and the diaphragm. On the other hand, the wastewater in the cathode compartment is alkaline, so insoluble hydroxides of alkaline earth metals may be generated to form a deposit that adheres to the surfaces of the electrodes and the diaphragm.

If electrode polarity is changed after the lapse of a certain time of treatment when the above-described contamination has progressed to some extent, the wastewater in the anode compartment which has so far been acidic turns alkaline whereas the wastewater in the cathode compartment which has been alkaline turns acidic and, as a consequence, the insoluble contaminants in the respective compartments will be dissolved away to thereby restore the permeate flow through the diaphragm and the electrolytic voltage. The shorter the interval between successive changes of polarity, the more effective the polarity change is in removing the contaminants. On the other hand, frequency polarity changes will cause the disadvantage of shortening the electrode life. Depending on the contaminant loading of the wastewater to be treated (which varies with the concentrations of the anionic surfactant, the oil content, alkaline earth metals, etc.), the interval of polarity changes may be determined within the range of 4–72 h.

The wastewater to be treated in the third aspect of the invention and the surfactants to be present in the wastewater are identical to those described in connection with the second aspect.

The mechanism by which the wastewater containing an emulsified oil is treated in the anode compartment of the diaphragm electrolyzer, as well as the effect of electrical permeation that is utilized to enrich the oil content are also identical to those described in connection with the second aspect.

The pH adjusted effluent from the anode compartment is returned to the anode compartment in the same manner as in the second aspect.

The diaphragm electrolyzer and the porous diaphragm which are to be employed in the third aspect of the invention are identical to those used in the first aspect.

Figure 3:
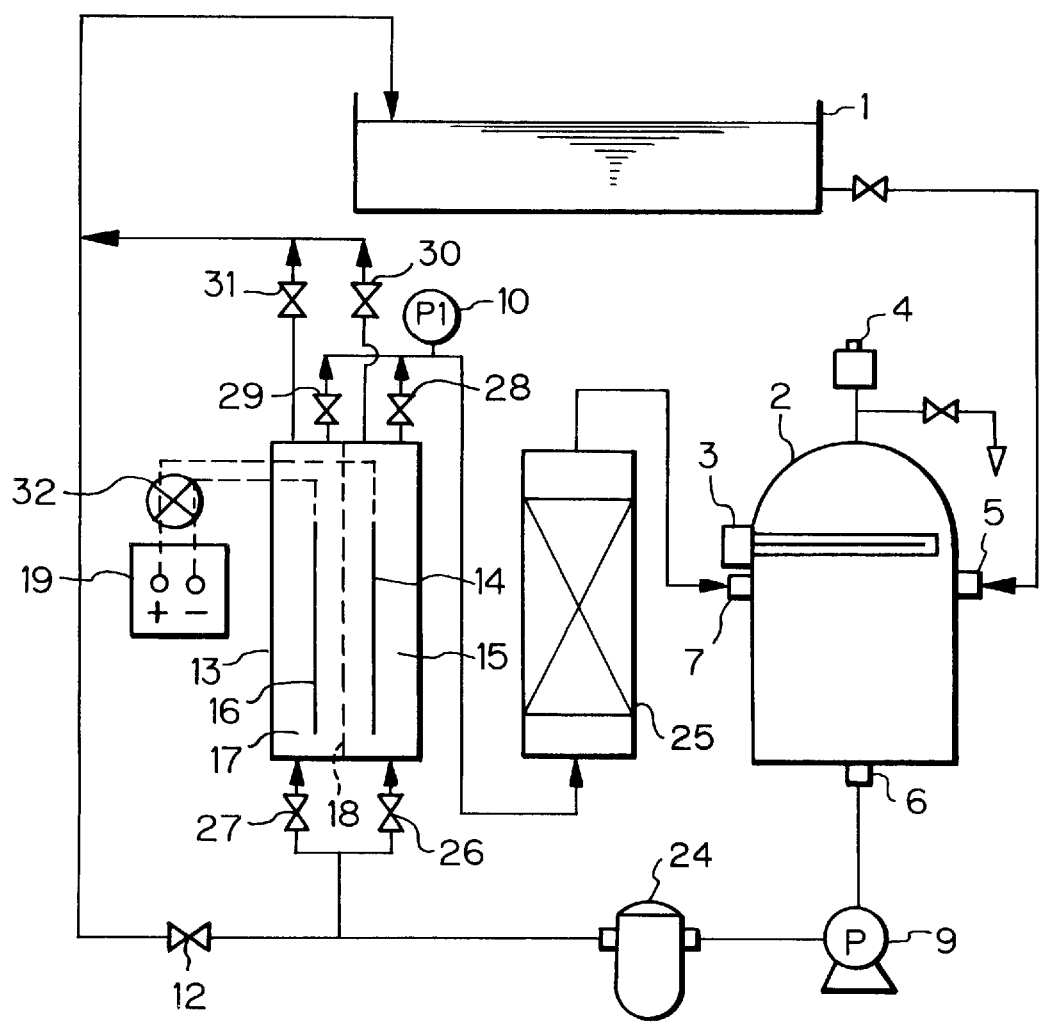
FIG. 3 shows schematically an example of the apparatus for performing oil-water separation according to the third aspect of the invention.

An example of the apparatus for performing oil-water separation according to the third aspect of the invention is shown in FIG. 3. A receptacle 1 holds wastewater containing an emulsified oil content. The wastewater is fed into an oil-water separation tank 2 via an inlet 5. The tank 2 is equipped with an electric heater 3 and an air vent valve 4. The wastewater emerging from the tank 2 via an outlet 6 is forced by a feed pump 9 to pass through a prefilter 24 into a diaphragm electrolyzer 13 at an anode compartment 15 containing an anode 14. The diaphragm electrolyzer 13 is divided into the anode compartment 15 and a cathode compartment 17 by a diaphragm 18 and they respectively contain the anode 14 and a cathode 16, which are supplied with a predetermined dc current from a power source 19. In the anode compartment 15, water is electrolyzed to generate hydrogen ions, which will cause the loss of the surface activity of the anionic surface active substance such as the sodium alkylsulfonate in the wastewater which has been fed into said anode compartment.

The wastewater thus rendered acidic emerges from the anode compartment 15 of the diaphragm electrolyzer 13 to pass through a column 25 packed with an adhering material and enter the oil-water separation tank 2 via an inlet 7; in the separation tank 2, the effluent is heated with the electric heater 3 to a temperature higher than the cloud point of the nonionic surfactant.

The effluent fed into the oil-water separation tank 2 needs only to be heated to a temperature in the range of 50°–80° C., preferably 60°–70° C., so that the oil content is selectively separated by flotation.

The effluent is allowed to stay within the oil-water separation tank 2 for a detention time of no more than about 20 minutes and the separated oil content is continuously or intermittently discharged out of the system whereas the aqueous phase is recovered from the tank 2 via the outlet 6 to return to the anode compartment 15, thereby accomplishing the intended oil-water separation.

The electrolyzed wastewater flowing from the anode compartment 15 past the diaphragm 18 to enter the cathode compartment 17 will emerge therefrom and passes through a valve 31 to be returned to the receptacle 1.

If these treatments are performed for a certain time period, the surfaces of the diaphragm and the electrodes will be gradually contaminated and, as a result, less water will permeate through the diaphragm to move from the anode to the cathode compartment, thereby increasing the electrolytic voltage required to maintain a constant electrolytic current level. If this condition occurs, a switching board 32 connected to the power source 19 is operated to change the polarity of the voltage applied to the electrolyzer 13 in such a way that the anode compartment 15 is switched to cathode compartment and the cathode compartment 17 to anode compartment while, at the same time, valves 26, 28 and 31 are closed whereas valves 27, 29 and 30 are opened. As a result, the contaminants are removed from the surfaces of the diaphragm and the electrodes to thereby restore the permeate flow and the electrolytic voltage.

(4) Fourth Aspect

In FIG. 3 showing the apparatus for performing oil-water separation according to the third aspect of the invention, the effluent (electrolyzed wastewater) from the anode compartment 15 passes through the packed column 25 to be returned to the oil-water separation tank 2.

As is well known, the faster the flow rate of the wastewater on the anode side of the porous membrane, the smaller the likelihood of membrane contamination and, as a result, one can retard the increase in the electrolytic voltage while preventing the drop in the permeate flux. In this respect, it is advantageous to increase the quantity of the feed to the anode compartment.

However, if the quantity of the feed to the anode compartment is increased in the oil-water separation system according to the third aspect of the invention, not only the time of contact in the packed column but also the time of detention in the tank for oil-water separation of the effluent from the anode compartment will decrease unavoidably and this in turn will interfere with the two phenomena desirable for the invention, i.e., the coalescing and coarsening of the oil particles in the packed column, and the floating of the oil content in the tank for oil-water separation of the effluent from the anode compartment.

Hence, the fourth aspect of the invention intends to provide a method and an apparatus for oil-water separation of wastewater containing an emulsified oil that are capable of increasing the flow rate of the wastewater on the anode side of the diaphragm without increasing the quantity of the feed to the packed column or the oil-water separation tank for the effluent from the anode compartment.

The fourth aspect of the invention relates to a method for oil-water separation of wastewater containing a surfactant and an oil content that has been emulsified by the action of said surfactant. As in the first aspect, the diaphragm electrolyzer used in the fourth aspect has an anode and a cathode provided in an anode compartment and cathode compartment, respectively, which are spaced apart by a porous diaphragm. As in the third aspect, the anode compartment of the diaphragm electrolyzer is supplied with the feed wastewater for electrolysis and part of the electrolyzed wastewater is passed through the diaphragm to enter the cathode compartment, from which it is discharged while the remainder of the electrolyzed wastewater is discharged from the anode compartment. In the fourth aspect, the electrolyzed wastewater discharged from the anode compartment is introduced into the intermediate portion of a gas-liquid separator and part of the influent is withdrawn from the top of the gas-liquid separator and introduced into a layer packed with an adhering material, where it is brought into contact with the adhering material and, thereafter, the effluent is directed to an oil-water separation step for accomplishing the intended oil-water separation while, at the same time, the remainder is withdrawn from the bottom of the gas-liquid separator to be returned to mix with the feed to the electrolysis step.

In a preferred embodiment, the polarities of the two electrodes are changed alternately at specified time intervals during the step of diaphragm electrolysis such that the anode compartment is switched to the cathode compartment and vice versa.

According to the fourth aspect of the invention, there is also provided an apparatus for oil-water separation of wastewater containing a surfactant and an oil content that has been emulsified by the action of said surfactant, which comprises a diaphragm electrolyzer having an anode and a cathode provided in an anode compartment and a cathode compartment, respectively, that are spaced apart by a porous diaphragm, a gas-liquid separator, a column packed with an adhering material, and a tank for oil-water separation of the effluent from the anode compartment, with the diaphragm electrolyzer, the gas-liquid separator, the packed column and the oil-water separation tank being interconnected by channels in such a way that the separation tank is supplied with the feed wastewater, which is withdrawn from the bottom of said separation tank to be fed into the anode compartment of said diaphragm electrolyzer, with part of the electrolyzed wastewater being passed through the diaphragm to enter the cathode compartment, from which it is discharged while the remainder of the electrolyzed wastewater is discharged from the anode compartment and thence introduced into the intermediate portion of the gas-liquid separator and a part of the influent is withdrawn from the top of the gas-liquid separator and introduced in an upward flow into the packed column, where it is brought into contact with the adhering material and, thereafter, the effluent is returned to the oil-water separation tank while, at the same time, the remainder is withdrawn from the bottom of the gas-liquid separator to be directly returned to the feed channel to the anode compartment.

In a preferred embodiment, the diaphragm electrolyzer is adapted to be capable of changing the polarities of the two electrodes alternately such that the anode is switched to the cathode compartment and vice versa while, at the same time, the pipes connecting to the anode and cathode compartments are accordingly switched.

Since the fourth aspect of the invention is similar to the third aspect in many ways, the following description concerns only the difference, which is the provision of a gas-liquid separator between the diaphragm electrolyzer and the column packed with an adhering material.

In the fourth aspect, the effluent from the anode compartment of the diaphragm electrolyzer is introduced into the intermediate portion of the gas-liquid separator and part of the influent is withdrawn from the top of the gas-liquid separator to be fed into the packed column whereas the remainder is withdrawn from the bottom of the separator to be returned to a suction port of a feed pump. In this way, the flow rate of the feed wastewater on the anode side of the diaphragm can be increased without increasing the quantity of the feed to either the packed column or the oil-water separation tank for the effluent from the anode compartment. The gas-liquid separator has the added advantage of providing an oil floating action due to the tiny oxygen bubbles in the wastewater which have been generated by electrolysis. Yet another advantage of the fourth aspect of the invention is that in order to increase the throughput of the overall system, one needs only to increase the sizes of the electrolyzer and the feed pump and there is no need to revamp the packed column and the oil-water separation tank for the effluent from the anode compartment.

If, on the other hand, part of the effluent from the anode compartment is simply returned to the suction port of the feed pump without passing through the gas-liquid separator, oxygen bubbles will accumulate and grow in the anode compartment to such a large size that the feed flow rate and the voltage become unstable.

The influent into the gas-liquid separator has desirably the longest possible detention time but 0.5–2 min will normally suffice. If desired, the gas-liquid separator may be fitted with a perforated plate for promoting the intended gas-liquid separation.

In the fourth aspect of the invention, the column packed with an adhering material is provided as a coalescer between the gas-liquid separator and the oil-water separation tank for the effluent from the anode compartment. The electrolyzed wastewater withdrawn from the top of the gas-liquid separator is returned to the associated oil-water separation tank after it is directed in an upward flow into the packed column such that it is brought into contact with the adhering material.

The purpose of causing the oil particles in the electrolyzed wastewater to attach to the adhering material and the advantages obtained were already described in connection with the third aspect.

The packed column to be used as a coalescer and its function were also described in connection with the third aspect.

As in the third aspect, the polarities of the two electrodes may be changed alternately and the resulting advantages are also the same as described in connection with the third aspect.

The wastewater to be treated in the fourth aspect and the surfactants to be present in the wastewater are also identical to those described in connection with the third aspect.

The pH adjusted effluent from the anode compartment is returned to the anode compartment in the same manner as in the second aspect.

The diaphragm electrolyzer and the porous diaphragm which are to be employed in the fourth aspect are also identical to those used in the first aspect.

Figure 5:
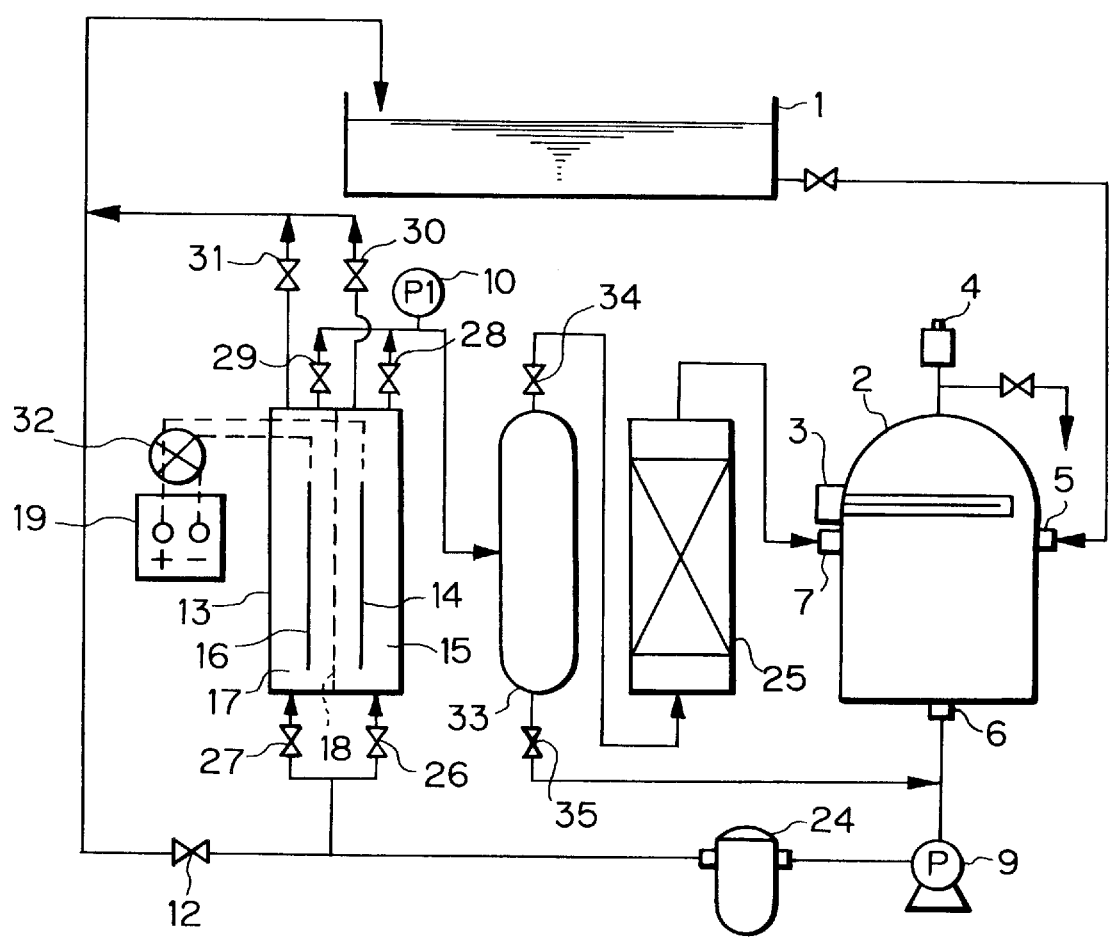
FIG. 5 shows schematically an example of the apparatus for performing oil-water separation according to the fourth aspect of the invention and used in Example 6.

An example of the apparatus for performing oil-water separation according to the fourth aspect of the invention is shown in FIG. 5. A receptacle 1 holds wastewater containing an emulsified oil content. The wastewater is fed into an oil-water separation tank 2 via an inlet 5. The tank 2 is equipped with an electric heater 3 and an air vent valve 4. The wastewater emerging from the tank 2 via an outlet 6 is forced by a feed pump 9 into a diaphragm electrolyzer 13 at an anode compartment 15 containing an anode 14. The diaphragm electrolyzer 13 is divided into the anode compartment 15 and a cathode compartment 17 by a diaphragm 18 and they respectively contain the anode 14 and a cathode 16, which are supplied with a predetermined dc current from a power source 19. In the anode compartment 15, water is electrolyzed to generate hydrogen ion, which will cause the loss of the surface activity of the anionic surface active substance such as the sodium alkylsulfonate in the wastewater which has been fed into said anode compartment.

The wastewater thus rendered acidic emerges from the anode compartment 15 of the diaphragm electrolyzer 13 to be introduced into the intermediate portion of a gas-liquid separator 33 and part of the influent is withdrawn from the top and passed through a column 25 packed with an adhering material and thence supplied into the oil-water separation tank 2 via an inlet 7; in the separation tank 2, the effluent is heated with the electric heater 3 to a temperature higher than the cloud point of the nonionic surfactant. The remainder of the influent into the gas-liquid separator 33 is withdrawn from the bottom and returned to the suction port of the feed pump 9.

The effluent fed into the oil-water separation tank 2 needs only to be heated to a temperature in the range of 50°–80° C., preferably 60°–70° C., so that the oil content is selectively separated by flotation.

The effluent is allowed to stay within the oil-water separation tank 2 for a detention time of no more than about 20 minutes and the separated oil content is continuously or intermittently discharged out of the system whereas the aqueous phase is recovered from the tank 2 via the outlet 6 to return to the anode compartment 15.

The electrolyzed wastewater flowing from the anode compartment 15 past the diaphragm 18 to enter the cathode compartment 17 will emerge therefrom and passes through a valve 31 to be returned to the receptacle 1.

If these treatments are performed for a certain time period, the surfaces of the diaphragm and the electrodes will be gradually contaminated and, as a result, less water will permeate through the diaphragm to move from the anode to the cathode compartment, thereby increasing the electrolytic voltage required to maintain a constant electrolytic current level. If this condition occurs, a switching board 32 connected to the power source 19 is operated to change the polarity of the voltage applied to the electrolyzer 13 in such a way that the anode compartment 15 is switched to cathode compartment and the cathode compartment 17 to anode compartment while, at the same time, valves 26, 28 and 31 are closed whereas valves 27, 29 and 30 are opened. As a result, the contaminants are removed from the surfaces of the diaphragm and the electrodes to thereby restore the permeate flow and the electrolytic voltage.

The following examples are provided for the purpose of further illustrating the four aspects of the present invention but are in no way to be taken as limiting.

EXAMPLE 1

An apparatus for oil-water separation was constructed according to the design of the first aspect of the invention shown in FIG. 1 and it was used in testing the oil-water separation of a cleaning solution. The diaphragm electrolyzer was a sealed rectangular type made of poly(vinyl chloride). The anode was a titanium plate with an area of 0.1 $m^2$ having a platinum plate deposited thereon and so was the cathode. The diaphragm was a MF membrane made of an organic synthetic polymer. The oil-water separation tank had a capacity of 36 L with a built-in electric heater of 1 kw.

A detergent was prepared from an aqueous solution containing 15% of a nonionic surfactant of a polyoxyethylene alkyl phenyl ether type having a cloud point of 49° C. and 3.5% of sodium sulfate. In the cleaning tank, the detergent was diluted with water to a concentration of 5% and had the pH adjusted with sodium hydroxide to 8.7, thereby preparing a cleaning solution of 200 L. The cleaning solution was used with its temperature controlled at 45° C.

An emulsifiable water-insoluble rust preventive oil was used in the test. This oil contained a large amount of a barium alkylsulfonate as a rust inhibitor.

Before starting the test for oil-water separation, 4 L of the rust preventive oil was charged into the cleaning tank and diluted with the cleaning solution to a concentration of 2%. In order to form a stable emulsion of the oil in the cleaning solution, the latter was agitated with a cascaded pump (3,600 rpm) for 30 min at a flow rate of 15 L/min.

Details of the testing procedure and conditions, as well as the test results are given below.

The cleaning solution in the cleaning tank was pumped into the anode compartment of the diaphragm electrolyzer at a flow rate of 200 L/h. The electrolytic current was set at 1.2 A such that the pH of the cleaning solution emerging from the anode compartment would be in the range of 5.0–5.5. The corresponding electrolytic voltage was about 6 V.

The cleaning solution exiting from the anode compartment was introduced into the oil-water separation tank, where it was heated to effect oil-water separation. The temperature setting of the built-in heater in the separation tank was 65° C. The oil-freed cleaning solution was sent to the cathode compartment of the diaphragm electrolyzer. The cleaning solution exiting from the cathode compartment was returned to the cleaning tank. The cleaning solution had a pH of 8.8 as it emerged from the cathode compartment.

Every two hours after the start of the test, the oil collecting in the upper part of the oil-water separation tank was discharged out of the system and the quantity of the oil thus discharged on each occasion was measured. The time-dependent profiles of the cumulative oil discharged and the oil concentration of the cleaning solution calculated from the cumulative oil discharged are shown in Table 1 below.

TABLE 1

| Time, h | Example 1 | | Example 2 | |
|---|---|---|---|---|
| | Cumulative oil discharge, L | Oil Concentration % | Cumulative oil discharge, L | Oil concentration, % |
| 0 | 0 | 2.0 | 0 | 2.05 |
| 2 | 1.18 | 1.4 | 0.91 | 1.6 |
| 4 | 2.12 | 0.9 | 1.75 | 1.2 |
| 6 | 2.98 | 0.5 | 2.50 | 0.8 |
| 8 | 3.75 | 0.1 | 2.98 | 0.6 |
| 10 | 4.13 | — | 3.36 | 0.4 |
| 12 | 4.42 | — | 3.49 | 0.3 |

As one can see from Table 1, effective oil-water separation could be accomplished in accordance with the first aspect of the invention.

After 10 h of the testing, the cumulative oil discharge exceeded 4 L, indicating that part of the nonionic surfactant in the cleaning solution was also separated by flotation together with the oil.

In order to demonstrate the effectiveness of diaphragm electrolysis performed in accordance with the first aspect of the invention, the following comparative test was made.

Comparative Example 1

An apparatus for oil-water separation of the same design as used in Example 1 was applied, except that the power supply to the diaphragm electrolyzer was turned off such that no electrolytic treatment would be performed. A test for oil-water separation was conducted using the same cleaning solution and rust preventive oil as employed in Example 1. When the cleaning solution having the rust preventive oil dispersed therein was not electrolyzed, no oil-water separation occurred in the cleaning solution.

EXAMPLE 2

A detergent was prepared rom an aqueous solution containing 15% of a nonionic surfactant of a polyoxyethylene alkyl phenyl ether type having a cloud point of 49° C., 6% of a nonionic surfactant of a pluronic type having a cloud point of 29° C. and 3.5% of sodium sulfate. In the cleaning tank, the detergent was diluted with water to a concentration of 5% and had the pH adjusted with sodium hydroxide to 9.7, thereby preparing a cleaning solution of 200 L. The cleaning solution was used with its temperature controlled at 40° C.

A mixture of a water-soluble cutting oil of type W1, an emulsifiable water-insoluble rust preventive oil and a non-emulsifiable water-insoluble cutting oil was used in the test. The water-soluble cutting oil, the rust preventive oil and the water-insoluble cutting oil were added at respective concentrations of 0.1%, 1.0% and 1.0%. The water-insoluble cutting oil had a small content of an anionic surface active substance; in contrast, the water-soluble cutting oil contained about 25% of an anionic surfactant (e.g. sodium alkylsulfonate or sodium alkylcarboxylate) and its mineral oil content was about 60%.

The testing equipment and procedure employed in Example 2 were identical to those used in Example 1; however, in order to ensure that the cleaning solution existing from the anode compartment would have a pH of 5.0–5.5, the electrolytic current was set at 10 A. The corresponding electrolytic voltage was about 20 V. The cleaning solution had a pH of 9.9 as it emerged from the cathode compartment.

The results of the test conducted in Example 2 are also shown in Table 1, from which one can see that effective oil-water separation was accomplished in accordance with the first aspect of the invention. In Example 2, the nonionic surfactant in the cleaning solution was not found to be separated by flotation together with the oil.

In order to demonstrate the effectiveness of diaphragm electrolysis performed in Example 2 according to the first aspect of the invention, the following comparative test was made.

Comparative Example 2

An apparatus for oil-water separation of the same design as used in Example 2 was applied, except that the power supply to the diaphragm electrolyzer was turned off such that no electrolytic treatment would be performed. A test for oil-water separation was conducted on a cleaning solution in which the same water-soluble cutting oil, rust preventive oil and water-insoluble cutting oil as used in Example 2 were dispersed.

When the cleaning solution having these three oils dispersed therein was not electrolyzed, no oil-water separation occurred in the cleaning solution.

According to the first aspect of the invention, the following advantages are obtained.

1) The method for oil-water separation of cleaning solutions according to the first aspect of the invention can effectively be used in separating an oil from water in a wide scope of cleaning solutions ranging from simple water to mixtures of water and nonionic or anionic surfactants.

2) The method of adding nonionic surfactants to cleaning solutions and heating them to temperatures higher than the cloud points of the surfactants is generally held to be effective in achieving oil-water separation of cleaning solutions containing oily contaminants; however, this method becomes ineffective if the cleaning solutions also contain anionic surfactants such as sodium alkylsulfonates which are heavily incorporated in water-soluble oils or anionic surface active substances such as calcium sulfonate which are incorporated in water-insoluble oils; in contrast, the method according to the first aspect of the invention is applicable under such adverse conditions and exhibits marked performance in oil-water separation.

3) The method according to the first aspect of the invention has no need to use violent chemicals such as acids and alkalies.

4) The method is capable of preventing the putrefaction of cleaning solutions even if no chemical sterilizers are added.

5) The apparatus for oil-water separation of cleaning solutions according to the first aspect of the invention is not costly, is simple to operate and guarantees consistent operation.

EXAMPLE 3

An apparatus for oil-water separation was constructed according to the design of the second aspect of the invention shown in FIG. 2 and it was used in testing the oil-water separation of wastewater containing an emulsified oil. The diaphragm electrolyzer was a sealed rectangular type made of polypropylene resin. Each of the anode and the cathode was a Pt-plated Ti electrode having an effective area of 0.1 m$^2$. The diaphragm was a MF membrane made of an organic synthetic polymer having a nominal pore size of 0.5 μm. The tank for oil-water separation of the effluent from the anode compartment had a capacity of 36 L with a built-in electric heater of 1 kw. The tank for oil-water separation of the effluent from the cathode compartment had a capacity of 10 L.

Liquid waste coolant was used in the test as the wastewater containing an emulsified oil. The liquid waste coolant was prepared by 30-fold dilution of a water-soluble cutting oil of type W1 and had an oil concentration of 1.8% and a pH of 8.8. After adding 0.05% of sodium tripolyphosphate to it, the liquid waste was first charged into the receptacle 1 from which it was injected into the tank 2 for oil-water separation of the effluent from the anode compartment. The injection of the liquid waste was 240 L.

The liquid waste was electrolyzed at a current of 20 A as it was forced by pump 9 to circulate between the anode compartment 15 of the electrolyzer 13 and the separation tank 2 at a flow rate of 8 L/min. The corresponding electrolytic voltage was about 56 V. The temperature setting of the electric heater 3 in the separation tank 2 was 55° C. The effluent from the cathode compartment 17 flowed at a rate of 0.32 L/min and had a pH of 11.3 and an oil concentration of 0.06%. The effluent was then returned to the receptacle 1.

When the electrolysis started, the pH of the effluent from the anode compartment declined gradually and it was 4.5 after the lapse of 2.2 h. Then, valve 12 was operated to have the effluent return continuously to the receptacle 1 such that its flow rate would be 0.15 L/min. Thereafter, the pH of the effluent stabilized in the neighborhood of 4.5. The effluent was found have an oil concentration of 0.3% at the outlet 6.

The time-dependent profile of the oil concentration of the liquid waste in the receptacle 1 is shown in Table 2. After the lapse of 12 h, the test was stopped and the oil was withdrawn from the separation tank 2 and the oil-separation tank 20 for the effluent from the cathode compartment via respective oil drain valves and a total of about 3.1 L of the oil was recovered. Thus, one may safely conclude that effective oil-water separation of the liquid waste coolant could be accomplished in accordance with the second aspect of the invention.

Comparative Example 3

In order to further clarify the effectiveness of the second aspect of the invention, a comparative test for oil-water separation was made with the same liquid waste by means of the same apparatus as in Example 3, except that the power supply to the electrolyzer was not turned on to perform an electrolytic treatment. In this case, no oil-water separation occurred in the liquid waste.

EXAMPLE 4

The second aspect of the invention was applied to treat wastewater containing an emulsified oil, which was an oil-containing cleaning solution of the type described below. A detergent was prepared from an aqueous solution containing 20% of a nonionic surfactant of a polyoxyethylene alkyl phenyl ether type having a cloud point of 49° C. and 3.0% of sodium sulfate. A 5% aqueous solution of the detergent was prepared in the receptacle 1 and adjusted to have a temperature of 45° C. and its pH adjusted to 9.8 with sodium tripolyphosphate and the thus prepared cleaning solution was used in a test for oil-water separation. The oil to be separated was an emulsifiable water-insoluble rust preventive oil. This oil contained a large amount of a barium alkylsulfonate as a rust inhibitor. Four liters of the oil was charged into the cleaning tank to give an initial oil concentration of 2%. In order to form a stable emulsion of the oil in the cleaning solution, the latter was agitated with a cascaded pump (3,600 rpm) for 30 min at a flow rate of 15 L/min.

The testing equipment and procedure employed in Example 4 were identical to those used in Example 3, except that electrolysis was performed at a current of 25 A; the corresponding electrolytic voltage was about 29 V. The temperature setting of the electric heater 3 in the tank 2 for oil-water separation of the effluent from the anode was 65° C. The effluent from the cathode compartment 17 flowed at a rate of 0.28 L/min and had a pH of 11.5 and an oil concentration of 0.15%.

When the electrolysis started, the pH of the effluent from the anode compartment declined gradually and it was 2.5 after the lapse of 3 h. Then, valve 12 was operated to have the effluent return continuously to the receptacle 1 such that its flow rate would be 0.1 L/min. Thereafter, the pH of the effluent stabilized in the neighborhood of 2.5. The effluent was found to have an oil concentration of 0.6% at the outlet 6.

The time-dependent profile of the oil concentration of the cleaning solution in the receptacle 1 is shown in Table 2. After the lapse of 12 h, the test was stopped and the oil was withdrawn from the separation tanks 2 and 20 via respective oil drain valves and a total of about 3.5 L of the oil was recovered, indicating that part of the nonionic surfactant in the cleaning solution was also separated by flotation together with the oil.

Thus, one may safely conclude that effective oil-water separation of the cleaning solution could be accomplished in accordance with the second aspect of the invention.

Comparative Example 4

In order to further clarify the effectiveness of the diaphragm electrolysis treatment according to the second aspect of the invention, a comparative test of oil-water separation was made with the same cleaning solution by means of the same apparatus as in Example 4, except that the power supply to the electrolyzer was not turned on to perform an electrolytic treatment. In this case, no oil-water separation occurred in the cleaning solution.

TABLE 2

| | Example 3 | Example 4 |
|---|---|---|
| Time, h | Oil concentration, % | Oil concentration, % |
| 0 | 1.8 | 2.0 |
| 2 | 1.5 | 1.7 |
| 4 | 1.1 | 1.4 |
| 6 | 0.8 | 1.2 |
| 8 | 0.6 | 1.0 |
| 10 | 0.5 | 0.9 |
| 12 | 0.4 | 0.8 |

According to the second aspect of the invention, continuous oil-water separation can be accomplished at low cost and with high efficiency on a wide variety of cleaning solutions including not only those contaminated by non-emulsifiable water-insoluble oils typified by press working oils and rolling mill oils but also those contaminated by water-soluble oils containing anionic or nonionic surfactants, as well as those contaminated by emulsifiable water-insoluble oils incorporating anionic surface active substances. The invention is also applicable to the oil-water separation of wastewater containing an emulsified oil as exemplified by water-soluble, liquid waste cutting oils and coolants.

EXAMPLE 5

An apparatus for oil-water separation was constructed according to the design of the third aspect of the invention shown in FIG. 3 and it was used in testing the oil-water separation of wastewater containing an emulsified oil. The diaphragm electrolyzer was a sealed rectangular type made of polypropylene resin. Each of the anode and the cathode was a Pt-plated Ti electrode having an effective area of 0.1 $m^2$. The diaphragm was a MF membrane made of an organic synthetic polymer having a nominal pore size of 0.5 $\mu$m. The layer packed with an adhering material was provided from ADVANTEC CORP. as a filter cartridge in the form of a pincushion (nominal filtering precision, 5 $\mu$m; filter medium made of PPS fibers), and the spatial velocity (SV) was 100 $h^-$. The tank for oil-water separation of the effluent from the anode compartment had a capacity of 36 L.

The wastewater containing an emulsified oil which was to be treated in Example 5 was warm cleaning water containing a water-soluble cutting oil of type W1. This cleaning water was subjected to continuous oil-water separation in the following manner. First, city water having 0.02% of sodium tripolyphosphate added was charged into the cleaning tank 1 and the oil-water separation tank 2 for the effluent from the anode compartment. The total water charge was 240 L. The water had a pH of 8.9 and it was held at 50° C. by means of the electric heater built in the cleaning tank 1. In the next step, a water-soluble cutting oil of type W1, No. 1 available from company X was injected continuously into the cleaning tank 1 at a flow rate of 1.3 mL/min. The cleaning water in the tank 1 was stirred with an agitator to disperse the water-soluble cutting oil.

The cleaning water thus prepared was forced by the pump 9 to circulate in a loop consisting of the anode compartment 15 of the electrolyzer 13, the packed layer 25 and the separation tank 2 at a flow rate of 8 L/min while electrolysis was conducted at a constant current of 25 amperes. At the start of the electrolysis, the electrode 14 was the anode whereas the electrode 16 was the cathode, with valves 26, 28 and 31 being fully open but valves 27, 29 and 30 fully closed. The effluent from the cathode compartment was returned to the cleaning tank 1 at a flow rate of 0.42 L/min with the pH being in the neighborhood of 11.0.

When the electrolysis started, the pH of the effluent from the anode compartment declined gradually and it was 6.0 after the lapse of 1 h. Then, valve 12 was operated to have the effluent return continuously to the cleaning tank 1 such that its flow rate would be 0.45 L/min Thereafter, the pH of the effluent stabilized in the neighborhood of 6.0.

Every 12 hours of the electrolytic treatment, the polarities of the two electrodes were altered. On the first occasion, the output polarity of the dc power supply was changed and, at the same time, the electrode 14 was switched to cathode whereas the electrode 16 was switched to anode, with the valves 26, 28 and 31 being rendered fully closed and the valves 27, 29 and 30 fully open. Subsequent polarity changes were made by reversing the procedure of the previous operation.

At intervals of several hours in the continuous test, the oil separated by flotation in the separation tank 2 was discharged and analysis of the oil concentration and TOC (total organic carbon concentration) of the cleaning water in the tank 1 was carried out. In addition, the electrolytic voltage was recorded for each analysis.

Figure 4A:
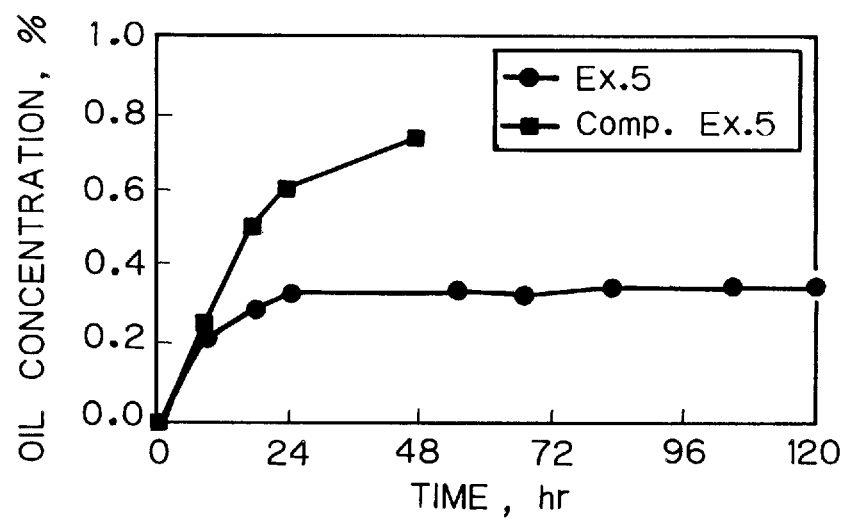
FIG. 4a is a graph showing the profiles of oil content obtained in Example 5 and Comparative Example 5.
Figure 4B:
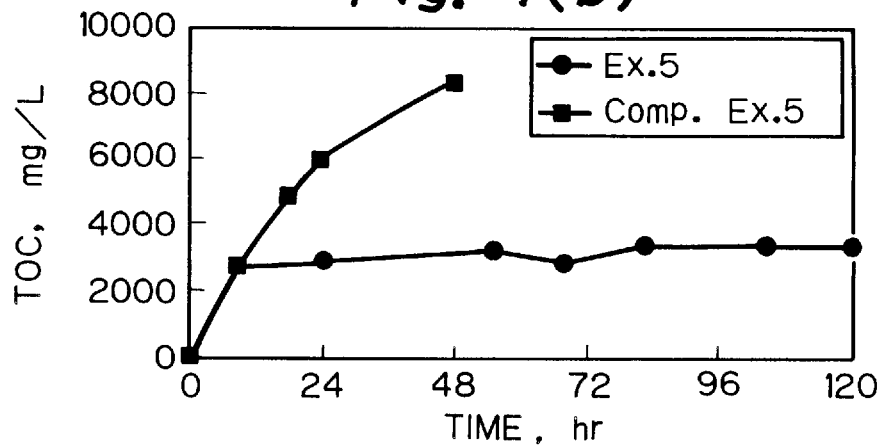
FIG. 4b is a graph showing the profiles of TOC obtained in Example 5 and Comparative Example 5.
Figure 4C:
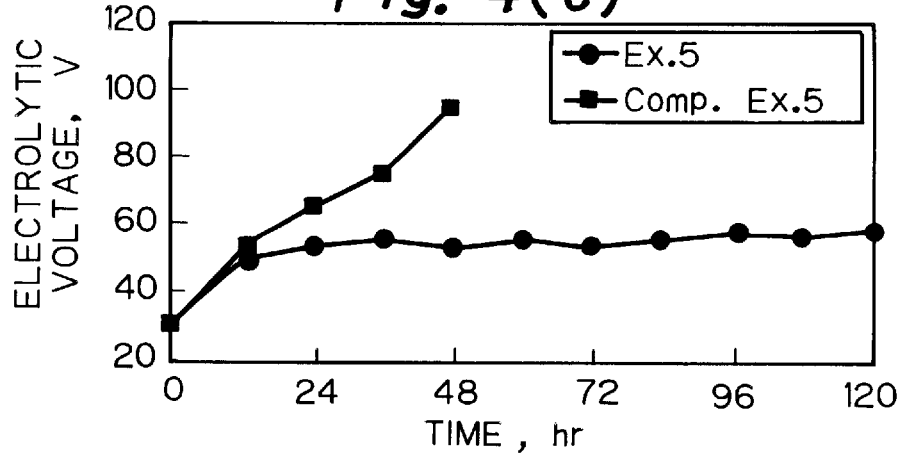
FIG. 4c is a graph showing the profiles of electrolytic voltage obtained in Example 5 and Comparative Example 5.

FIGS. 4a and 4b show the time-dependent profiles of the oil concentration and TOC of the cleaning water, and FIG. 4c shows the profile of electrolytic voltage. Obviously, the oil-water separation of the cleaning water containing the water-soluble cutting oil could be effectively accomplished in accordance with the third aspect of the invention and one may safely conclude that the electrolytic voltage remained fairly constant.

Comparative Example 5

In order to further clarify the effectiveness of the third aspect of the invention, a comparative test for oil-water separation was made with the same apparatus and under the same conditions as in Example 5, except that the packed layer 25 was not provided and that no polarity changes were effected. The data of the comparative test are also shown in FIGS. 4a–4c. Obviously, in the absence of the packed layer, no effective oil-water separation could be accomplished at a fairly high pH (6.0 in the comparative case). In order to perform effective oil-water separation of the cleaning water in the absence of the packed layer 25, the return flow to the cleaning tank 1 had to be reduced while, at the same time, the pH of the effluent from the anode compartment had to be lowered to 4.5.

The electrolytic voltage which was about 30 volts at the start of the electrolysis increased gradually and 48 h later, it became as high as 95 volts. Since the temperature of the effluent from the cathode compartment at that time was 85° C. which was close to the heat resisting limit of the electrolyzer, the test was suspended.

According to the third aspect of the invention, the following advantages are obtained.

a) The packed layer with an adhering material is provided as a coalescer between the anode compartment of the diaphragm electrolyzer and the tank for oil-water separation of the effluent from the anode compartment and this is effective in raising the pH for oil-water separation and thereby achieving improved performance in oil-water separation.

b) Since the electrolyzed wastewater makes highly efficient contact with the oil content in the packed layer, the hydrophobic organic matter in the electrolyzed wastewater can be extracted with the oil content and, hence, can be rejected out of the system together with the latter.

c) By changing the polarities of the two electrodes alternately at specified time intervals, the permeate flow from the anode to the cathode compartment, as well as the electrolytic voltage required to maintain a contact current level can be held within specified ranges for a prolonged time period.

EXAMPLE 6

An apparatus for oil-water separation was constructed according to the design of the fourth aspect of the invention shown in FIG. 5 and it was used in testing the oil-water separation of wastewater containing an emulsified oil. The diaphragm electrolyzer was a sealed rectangular type made of polypropylene resin. Each of the anode and the cathode was a Pt-plated Ti electrode having an effective area of 0.2 m². The diaphragm was a MF membrane made of an organic synthetic polymer having a nominal pore size of 0.5 μm. The packing material was provided from ADVANTEC CORP. as a filter cartridge in the form of a pincushion (nominal filtering precision, 5 μm; filter medium made of PPS fibers), and the spatial velocity (SV) was 100 h$^{-1}$. The tank for oil-water separation of the effluent from the anode had a capacity of 36 L and the gas-liquid separator 33 had a capacity of 10 L.

The wastewater containing an emulsified oil which was to be treated in Example 6 was warm cleaning water containing a water-soluble cutting oil of type W1. This cleaning water was subjected to continuous oil-water separation in the following manner. First, city water was charged into the cleaning tank 1 and the oil-water separation tank 2 for the effluent from the anode compartment. The total water charge was 240 L. The water was held at 50° C. by means of the electric heater build in the cleaning tank 1. In the next step, a water-soluble cutting oil of type W1, No. 1 available from company X was injected continuously into the cleaning tank 1 at a flow rate of 3.0 mL/min. The water in the cleaning tank 1 was stirred with an agitator to disperse the water-soluble cutting oil.

The cleaning water thus prepared was forced by the pump 9 to flow at a rate of 16 L/min while electrolysis was conducted at a constant current of 50 amperes, with the valve 34 being adjusted to provide a flow quantity of 8 L/min from the gas-liquid separator 33 to the packed column 25 whereas the valve 35 was adjusted to provide a return flow of 8 L/min to the suction port of the feed pump 9. At the start of the electrolysis, the electrode 14 was the anode whereas the electrode 16 was the cathode, with valves 26, 28 and 31 being fully open but valves 27, 29 and 30 fully closed. The effluent from the cathode compartment was returned to the cleaning tank 1 at a flow rate of 0.9 L/min with the pH being in the neighborhood of 11.0.

When the electrolysis started, the pH of the effluent from the anode compartment declined gradually and it was 5.5 after the lapse of 1 h. Then, valve 12 was operated to have the effluent return continuously to the cleaning tank 1 such that its flow rate would be 0.9 L/min. Thereafter, the pH of the effluent stabilized in the neighborhood of 6.0.

Every 12 hours of the electrolytic treatment, the polarities of the two electrodes were altered. On the first occasion, the output polarity of the dc power supply was changed and, at the same time, the electrode 14 was switched to cathode whereas the electrode 16 was switched to anode, with the valves 26, 28 and 31 being rendered fully closed and the valves 27, 29 and 30 fully open. Subsequent polarity changes were made by reversing the procedure of the previous operation.

At intervals of several hours in the continuous test, the oil separated by flotation in the separation tank 2 was discharged and analysis of the oil concentration of the cleaning water in the tank 1 was carried out.

Figure 6:
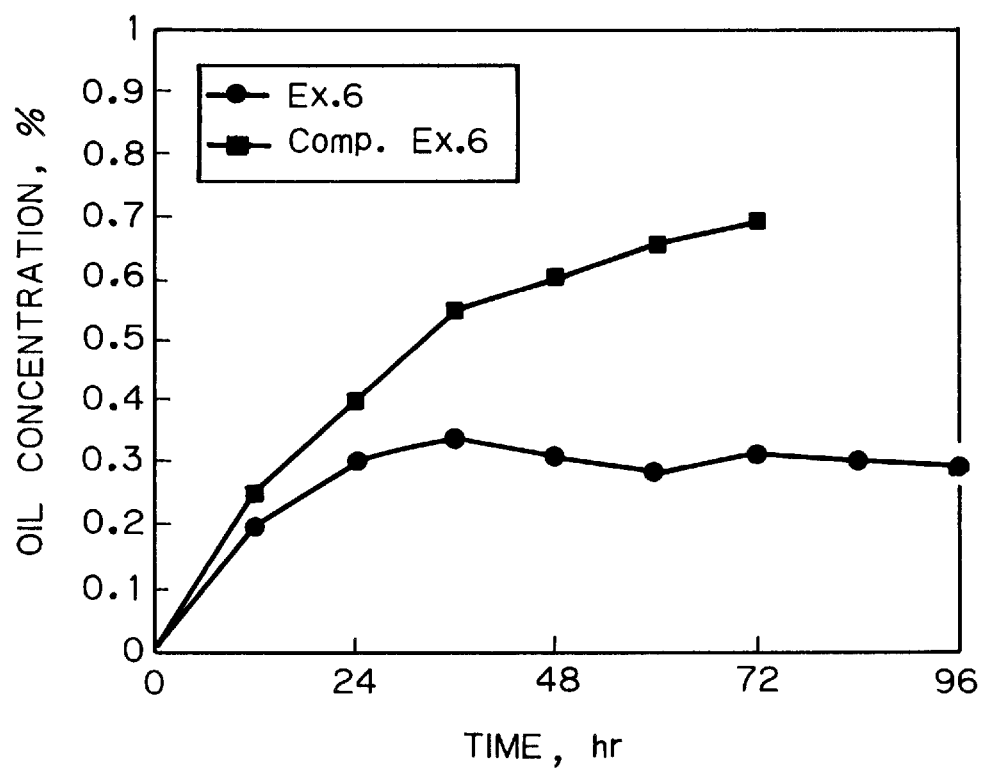
FIG. 6 is a graph showing the profiles of oil content obtained in Example 6 and Comparative Example 6.

FIG. 6 shows the time-dependent profile of the oil concentration of the cleaning water.

Comparative Example 6

In order to further clarify the effectiveness of the fourth aspect of the invention, a comparative test for oil-water separation was made with the same apparatus and under the same conditions as in Example 6, except that no gas-liquid separator was provided. The data of the comparative test are also shown in FIG. 6.

According to the fourth aspect of the invention, the following advantages are obtained.

a) The flow rate of the liquid on the anode side of the diaphragm in the electrolyzer can be increased without increasing the quantity of the flow to the packed column or the tank for oil-water separation of the effluent from the anode compartment and, hence, the chance of membrane contamination becomes even smaller than in the third aspect.

b) There is provided an oil floating action in the gas-liquid separator due to the tiny oxygen bubbles in the wastewater which have been generated by electrolysis.

c) The throughput of the overall system can be increased by merely increasing the sizes of the diaphragm electrolyzer and the feed pump.

What is claimed is:

1. A method for oil-water separation of a cleaning solution in an oil-water separation step as it comes from a work cleaning step together with an oily contaminant, said method comprising feeding the contaminated cleaning solution into the anode compartment of a diaphragm electrolyzer that is supplied with a current due to the application of a dc voltage between an anode and a cathode, heating the cleaning solution after it has passed through the anode compartment, introducing the heated cleaning solution to the oil-water separation step, where oil is separated from the water, feeding the oil-free cleaning solution into the cathode compartment of the diaphragm electrolyzer for neutralizing, and returning the neutralized cleaning solution to the work cleaning step.

2. A method according to claim 1, wherein said cleaning solution is water.

3. A method according to claim 1, wherein said cleaning solution is water having a surfactant incorporated therein.

4. A method according to claim 1, wherein said cleaning solution is water having a nonionic surfactant incorporated therein.

5. A method according to claim 1, wherein said cleaning solution is water having incorporated therein both a nonionic surfactant having a cloud point of 20°–40° C. and a nonionic surfactant having a cloud point of 40°–80° C.

6. A method according to claim 1, wherein said cleaning solution is water having incorporated therein a nonionic surfactant having a cloud point of 20°–40° C., a nonionic surfactant having a cloud point of 40°–80° C., and a builder.

7. A method according to claim 6, wherein said builder is sodium sulfate.

8. An apparatus for oil-water separation of a cleaning solution, which comprises cleaning solution tank, a diaphragm electrolyzer having an anode and a cathode provided in an anode compartment and a cathode compartment, respectively, that are spaced apart by a porous diaphragm, and an oil-water separation tank, said apparatus being so adapted that a contaminated cleaning solution is fed from said cleaning solution tank into the anode compartment of said diaphragm electrolyzer, from which it is fed to the oil-water separation tank through an inlet and emerges therefrom through an outlet to be fed into the cathode compartment of said diaphragm electrolyzer for neutralization, with the neutralized cleaning solution being returned to said cleaning solution tank.

* * * * *